United States Patent Office 3,560,399
Patented Feb. 2, 1971

3,560,399
ACTIVATED DEVELOPER AND METHOD
OF FLAW DETECTION
John E. Irsak, Bay Village, Ohio, assignor to
Day-Glo Color Corporation
No Drawing. Filed Oct. 24, 1965, Ser. No. 504,980
Int. Cl. C09k 3/22; G01n 21/16
U.S. Cl. 252—301.2                                  8 Claims

ABSTRACT OF THE DISCLOSURE

Sensitivity of powder-developed penetrant system of flaw detection increased by partially pre-wetting of powdered developer with solvator for flaw-indicating dye. The presence of solvator for the dye provides the option of carrying (or not carrying) at least some of at least one of what would otherwise be a component of a flaw penetrant liquid, such as one or more flaw-indicating dyes.

---

This invention relates to improvements in penetrant methods of flaw detection, flaw detection materials, and, more particularly, to activated dry developers for improving the detectability of flaws by methods employing such novel developers.

Penetrant methods of flaw detection are used to determine whether a tested article (hereinafter the "test body") has any sub-surface flaws having openings extending to the surface of the test body; these flaws may range from "blow-holes" in castings to practically sub-microscopic cracks in highly finished surfaces. The methods essentially involve the application, on the surface of the test body, of a penetrant liquid able to penetrate into such flaws; thereafter the liquid is removed from the surface of the test body, but not from the flaws, whereby, upon the subsequent appearance of the penetrant at and adjacent to the flaw openings, the existence and location of the flaws may be ascertained.

Penetrant methods of flaw detection have been widely adopted since the introduction of fluorescent penetrant methods of flaw detection. As disclosed in U.S. Pat. No. 2,259,400, issued in 1941 to R. C. Switzer, such fluorescent penetrants provide an enormous contrast ratio between the visible fluorescence of the penetrant at and about the flaw openings and the relative absence of visible light emitted or reflected from adjacent areas of the test body, thus permitting the rapid and highly sensitive detection of existing flaws when the test body is examined under filtered ultraviolet radiation ("black light"). Such methods are widely used in many industries, but particularly in the aircraft and space industries, for production and maintenance of parts and structures subjected to stress under load; this is due to the fact that the existence of an undetected surface discontinuity in a stressed part can be the cause of, or starting point for, a partial or complete failure or malfunction of the entire structure or the defective part. Fluorescent penetrant methods are not only simpler but at least as effective as any alternative methods of flaw detection.

Ever since their commercial adoption after initial disclosure in the above Switzer patent, these fluorescent penetrant methods have been subjected to intensive research and study in a continuing effort to improve their speed, sensitivity, and reliability, and many significant advances in the art have resulted. One area that has long been explored is that of absorptive developers for improving the distinctiveness of the flaw indication after cleaning the penetrant from the surface article. Such developers are essentially and generally comprised of finely divided powders which are absorptive of the liquid penetrant and, thereby, tend to aid the exudation of the penetrant liquid from the flaw opening and also prevent it from spreading beyond the flaw opening and, thus, become over-attenuated and less effective as an indicator. These absorptive developers also are white or highly reflective of the visible light emitted and/or reflected by the penetrant liquid; accordingly, they may provide a brighter indication than would be obtained if the penetrant liquid were allowed to spread over the surface of the test body, which may often be of a dark color that absorbs the light projected by the minute amount of penetrant appearing at and around the flaw opening.

The aforesaid prior art developers may be applied to the test body as a loose, dry powder (which attaches itself to the surface of the test body where wetted by penetrant liquid appearing at the flaw opening) or as a suspension in a volatile liquid (which, upon evaporation, leaves a thin and fairly uniform deposit of the absorptive powder over the surface of the test body). In either case, the absorptive powder in the developer functions as a reflective "blotter" for the exuding penetrant and also masks the "background scum." (Background scum usually consists of a thin film or residue of penetrant liquid that was not completely removed from unflawed surface areas of the test body; the "scum" may also be supplied by light reflected or emitted by the surface of the test body itself. In either case, such "background scum" tends to diminish the contrast ratio between a flaw indication and adjacent unflawed areas and, thereby, diminish the effectiveness or sensitivity of the testing method.)

Surprisingly, in contrast with the success of the efforts to improve penetrant methods in other aspects, the efforts to improve developers have heretofore met with little success beyond relatively routine advancements in the selection of specific absorptive powders. Indeed, the course of some recent developments has been in the direction away from use of such developers. See, for example, U.S. Pat. No. 3,114,037, issued to Joseph L. Switzer, Dec. 10, 1963, for "Self-Developing Penetrant Methods and Penetrant Therefor."

An object and advantage of this invention is that it provides an absorptive developer which not only overcomes drawbacks of and objections to prior absorptive developers but provides sharper and more distinct and sensitive flaw indications than heretofore possible. An objection to prior art developers was that they were ineffective if applied too sparsely to a test body and, if applied in a layer which was too thick, not only was background scum masked but indications of minute flaws might also be masked; further, many test bodies which are tested and found acceptable must be cleaned of any developer or flaw indication before use and removal of the developer, usually in a fine powder form, can present cleaning problems. By preferred embodiments of this invention, not only are minute flaw indications not masked, but finer and more minute flaws are more readily revealed than have been revealed by prior procedures; also, cleaning problems may be minimized.

A totally unexpected and further advantage of this invention is that greater sensitivity is also attained with the use of less expensive penetrants that need not be critically controlled in their formulation. The net result is that improved detection may be obtained at less cost.

Other objects and advantages of this invention will be apparent from the following general description, specific examples (which are to be understood as being illustrative and not as limitations), and claims.

Essentially this invention involves the novel utilization of the function of the components of the more effective penetrant liquids heretofore developed and consequent reformulation of both the penetrant and a developer, plus a phenomenon in the behavior of developers made according to this invention which may be observed in the use of this invention but is not yet fully understood or satisfactorily explained.

In regard to the reformulation of the penetrant and developer, the more satisfactory penetrants have heretofore been formulated from a dye dissolved in a liquid having at least two significant fractions; the first fraction, hereinafter termed a "diluent," is often relatively volatile and is derived from a liquid having a low viscosity to impart fluidity to the penetrant; the second fraction, which may be derived from one or more solids or liquids, is less volatile and usually somewhat more viscous than the diluent. The second fraction may have several functions, i.e., to improve the ability of the pentrant liquid as a whole to wet the surface of the test body and thus penetrate into the flaws, to improve the "creep-out" of the penetrant in the flaws after removal from the surface of the test body and, if the penetrant is of an oily nature, the second fraction may be an emulsifier permitting the removal of the penetrant from unflawed surfaces by washing with water, as disclosed, for example, in the U.S. patent to R. A. Ward, No. 2,405,078. Another, though less emphasized function of the second fraction in many, but not necessarily all, prior art penetrants is that it is a mutual volvent for the dye and diluent and will retain the dye in solution if any of the diluent evaporates from the penetrant after application of the penetrant to the test body. This can be an extremely important function when the minute portions of the penetrant creep out of the flow openings after the penetrant has been cleaned from the surface of the test body; if the evaporation of the diluent at this stage should tend to throw the dye out of solution, the indication might not be discernible due to the characteristic loss of fluorescence and color of unsolvated dye. Accordingly, for purposes of this invention, this second significant fraction of a penetrant is hereinafter referred to as the "solvator."

As for the phenomenon involved in this invention, I have noted that, when a dry finely divided powder has been first wetted with the penetrant liquid and then dried sufficiently to restore its pulverulent, free-flowing condition but not to the extent that the absorbed liquid has been completely driven off, the tendency of the powder to cling to the dry surface of a test body can be noticeably less than the tendency of the same powder prior to wetting; however, when such treated or activated powder contacts a portion of the test body surface which has been wetted with the same liquid with which the powder has been treated or with another liquid (in which the treating liquid is preferably mutually soluble) the activated powder tends to cling and cover the wetted surface as well or more so than the untreated powder. Stated in another way, the activated powder can have a lesser affinity for dry surfaces than the untreated powder, but an equal or greater affinity for wetted surfaces, thereby increasing the fine-crack sensitivity of systems employing the activated developer. Still further, the pre-wetting of the diffuse-reflecting surface of the developer with a solvator provides an environment enhancing the brightness of the dyes. Obviously, surface-active forces are involved in this phenomenon but what the forces are or how or why they act is not understood or readily explainable.

Applying the foregoing, this invention may be practiced in any one of the three following general systems (without excluding the other systems or permutations and combinations among the several systems).

System I—Conventional penetrant—activated developer powder

The absorptive developer powder may be any one of several heretofore commercially available absorptive developer powders for penetrant methods of flaw detection. Or the developer may comprise other relatively white or reflective materials, substantially insoluble in, and/or absorptive of, the penetrant liquid to be employed when powdered sufficiently to be screened through a 100 mesh screen or finer or otherwise have its coarser particles eliminated. Suitable developer materials, either alone or in combination, may include silica aerogels, aluminum silicates, precipitated chalks, magnesium and calcium carbonates, talcs, diatomaceous earth, and clays, such as kaolins and bentonites (including purified and/or reacted bentonites known commercially as "Bentones"). Other operative developers may include lithopone, activated alumina and aluminum hydrates, as well as suitable organic materials, such as ethyl cellulose, sucrose, wood flours, and sawdusts.

The developer may be activated by preparing a slurry of the developer and a solvator for the dye or dyes of the penetrant liquid. The solvator is normally diluted, preferably with a diluent relatively more volatile than the solvator. The diluent is generally, for economy, a volatile hydrocarbon fraction such as naphtha, benzene, or kerosene, but may include alcohols, ketones, and ethers, for example. The solvator is generally a commercial organic surface active agent or plasticizer of which the N-alkyl substituted toluene sulfonamides, alkyl aryl phosphates, alkyl phenoxy polyethoxy alcohols, and dialkyl phthalates are typical examples. Instead of the above materials one may use various other carriers as solvators for the dyes, such as the various glycol ethers, white oils, fluorocarbons such as those commercially available as Kel-F oils, and the like.

After forming the above slurry, the developer powder is separated, preferably by filtering, so that the liquid may be recovered for preparation of subsequent quantities of the activated developer. The damp powder is then dried until the powder is again free-flowing but not totally freed of the solvator with which it was wetted, any lumps or agglomerates being broken up or separated by screening or milling. If the solvator absorbed on the powder is so volatile a material as to be likely to evaporate from the powder during storage, it should be used promptly; if the solvators are of the preferred less volatile type, the activated developer powders may be stored without serious loss of activity for months and, apparently, for years.

Methods other than the foregoing method of treating the developer in a liquid slurry may be employed, such as, for example, by liquid emulsion coating, or dry jet coating. indeed the solvator retained on or in the developer need not be a liquid, as such, at the time of treatment, but may be a gas or vapor.

To utilize the above-described activated developer according to this first system, a suitable penetrant may be applied according to the appropriate techniques up to and through the stage of cleaning the penetrant from the surface of the test article. Such a suitable penetrant may be any one of those disclosed in the above Switzer patent or in the Ward patent (No. 2,405,078) or a "post-emulsification" penetrant as disclosed in U.S. Pat. No. 2,806,959 issued to Taber de Forest, or a water base penetrant as disclosed in U.S. Pat. No. 3,028,338, issued to Donald W. Parker, Jr., or, in case non-fluorescent penetrants are employed, a penetrant as disclosed in U.S. Pat. No. 2,839,918, issued to Robert C. Switzer. As the penetrant in the flaws is about to appear or has commenced to appear at and around the flaw openings, the activated developer powder is then applied over the surface of the test body. When applied by dusting as a dry powder, it clings to the surface of the test body where wetted by the exuding penetrant but may be removed from unflawed areas by very gentle shaking or blowing if the powder does not fall off by gravity. Where retained on the test body, the activated developer performs the normal function of serving as a blotter to aid in the exudation of the penetrant and providing the desired reflective background for the flaw-indicating light projected by the penetrant, but, more particularly and uniquely, enhances the brightness and sensitivity of the flaw indications by furnishing a more suitable environment maintaining the dye in the desired solvated state.

The principal functional advantages of the above-described system are the greater sharpness and brightness of the indications obtained and the apparent improvement in the speed of development of the indications. Since such a solvator is usually the most expensive and critically formulated component of the penetrant, the cost of the penetrant may be reduced by reducing the properties of the solvator to the minimum necessary to allow it to perform its other functions of aiding penetration and creep-out. The presence of the solvator in the activated developer insures that the dye will be maintained in a highly solvated state and not lose its effectiveness due to evaporation of the diluent. Instead, it will be retained at full effectiveness where it is needed, that is, on and in the developer providing the optimum background and environment for the dye. The improvement is most apparent in enhancing the sensitivity and effectiveness of penetrant methods employing fluorescent dyes, but it is also effective when non-fluorescent dyed penetrants are employed.

System II—Cascading fluorescent dye penetrant—activated developer carrying cascaded dye This invention is particularly useful for flaw detection systems utilizing so-called sensitizing or cascading fluorescent dyes as disclosed in U.S. Pat. No. 2,920,203, issued to Joseph L. Switzer and Donald W. Parker, Jr.

According to this system, the activated powder is prepared as described in System I above except that the dye solvator absorbed on the powder also carries at least one of a series of dyes in which one dye fluoresces in response to light of lower wave lengths emitted by the other when both dyes are carried in a mutual solvator. As indicated by the above Switzer, et al., patent, theoretically any number of cascading dyes could be employed but, practically, two dyes, a cascading dye emitting light in the blue range and a cascaded dye, emitting light in the yellow-green to red range, are sufficient. Cascading dyes in the blue range may be, for example, 4-methyl, 7 diethyl amino coumarin, fluoranthene, and beta methyl umbelliferone dissolved in proportions ranging from as low as 0.001 gram per 100 milliliters of solvator to seldom more than 20.0 grams per 100 milliliters of solvator. The cascaded dyes may be, for example, Fluorescein (yellow-green), Fluorol 5 GA and Fluoral 7GA (yellow); Rhodamine 6 GDN base (yellow-orange), and Rhodamine B base (red), carried in a solvator in proportions ranging from as low as 0.001 to as high as 20.0 grams per 100 milliliters of solvator. The amount of solvated dye carried by the developer is preferably in the range of 0.01 gram to 10.0 grams of dyes per 100 grams of finished (i.e., activated and dyed) developer.

According to this second system, one of the dyes of the series (or more, if more than two dyes are employed in the series) is dissolved in the requisite proportion in the activating liquid prior to activating the powder as disclosed in System I above; this dye is preferably the cascaded dye, and, thus, the activated powder will have a yellow to red tinge. The other dye (or dyes) of the series is dissolved in the suitable penetrant liquid, which, therefore, usually fluoresces blue. As in System I above, conventional techniques may be followed up to the stage where the penetrant commences to appear at the surface openings of the flaws. The activated dyed developer is then applied by dusting over the test body, clinging where it contacts the exuding penetrant.

The advantages of the foregoing system are those of System I plus the unusual sensitivity of the system.

System III—Dyeless penetrant-dyed activated developer

According to this system, the flaw indicating dyes are omitted altogether from otherwise conventional penetrants. Thus, the penetrant may consist simply of a diluent, such as kerosene or any other suitable flaw-penetrating diluent, or a diluent formulated with a solvator or surface-active agent to improve the penetration and creep-out characteristics of the penetrant liquid.

The activated developer is prepared as in System II above; a single dye may be employed but preferably all of the dyes in a series of cascading dyes are dissolved in the activating liquid in order to take advantage of the optimum brightness afforded by cascading dyes.

As in the preceding systems, the penetrant liquid is applied to the test body and any suitable technique is followed up to the stage where the penetrant commences to appear at the flaw openings after cleaning or otherwise removing applied penetrants from the unflawed surfaces of the body. Because the penetrant is relatively colorless and either nonfluorescent or only weakly fluorescent due to the so-called natural fluorescence of some diluents, imperfect cleaning may not be too reliably checked by inspection under visible or black light. Thus, more than usual care should be employed in the cleaning operation to remove applied penetrant from unflawed surfaces of the test body without removing it from the flaws into which it penetrated. Thereafter, the dyed activated developer is applied to the test body, the location of flaws being revealed by the fluorescence or color of the developer that clings to the test body at the flaw openings.

The advantage of this third system is that, in penetrant methods of flaw detection, the penetrant has heretofore been the most expensive element due to the relatively large volumes which are lost through the removal from the test body surfaces. By this present system, the cost of the penetrant may be greatly reduced by incorporation of all the dye and some or all of the solvator in the developer rather than the penetrant. Thus, by this system, a lesser amount of dye and a lesser amount of solvator is required per unit of surface area tested than is required by other methods. The portion of the dyed developer that is not retained on the surface of a test body at a flaw opening is not necessarily lost but may usually be recovered and re-used on subsequent test bodies.

In all of the foregoing systems, it is important that the amount of residual dye solvator carried by the activated developer be less than that which completely saturates the absorbency of the powder and that the powder is restored to a free-flowing condition after activation, as by agitation so that there can be granular flow of the particles under the influence of gravity. The maximum amount of solvator which the powder can safely carry appears to be just less than that which will form a continuous phase when a quantity of activated powder is compressed to its minimum bulk. There appears to be no minimum of activator-to-powder ratio in the activated developer since, when the particles are once wetted with even the most volatile dye-dissolving fluids, prolonged heating, short of calcining, appears to leave some trace of the once-absorbed fluid; as the proportion of solvator activating the powder is decreased appreciably below the safe maximum, however, the degree of activation of the powder and its effectiveness likewise decreases more or less proportionately.

It is also to be understood that in the foregoing specification and the appended claims the term "solvation" includes a state akin to solution as well as true solution and the verbal root "solvate" and other terms derived therefrom (e.g. "solvator," "solvatable," etc.) are used in a like inclusive sense. Likewise, the verbs "cause" and "allow" and their derivatives, when used in reference to the reappearance of a penetrant at a flaw opening, are to be considered as interchangeably synonymous; e.g. a penetrant liquid may be "caused" to exude to and around the surface opening of a flaw by active steps, such as heating or vibrating, to drive the liquid out of the flaw or by the purely passive step of allowing time to elapse until the liquid within a flaw is drawn to and around a flaw opening by the surface active forces of the penetrant with respect to the substance of the test body.

Also, with respect to the manner in which the solvating substance is carried by the developer powder, the physical phenomena of absorption and adsorption are to be deemed as interchangeably synonymous; thus, due to the small average particle size of the developer powders and the apparent microporosity of many of them, it appears to be a matter of irrelevant academic interest only as to whether the solvating substance is held by adsorption due to surface attraction to the powder particles or by absorption due to mechanical entrapment in the porosity of the powder particles, or both.

Still further, it appears to be a matter of immaterial irrelevancy as to whether the solvating substance, when carried by the developer powder, is, in the classic sense, in a gaseous, liquid, or solid state; thus, to the extent the following claims indicate the physical state of the solvating substances on and/or in the developer powder, such state is to be assumed to be in the state of the substance as it exists as a separate mass at normal room temperature and pressures.

As evident from the foregoing illustrative disclosure, this invention is not limited to the specific embodiments disclosed but may be varied and modified within the scope of the invention as defined in the following claims.

What is claimed is:

1. In a penetrant method of flaw detection comprising the steps of applying a penetrant liquid to a test body suspected of having sub-surface flaws having surface openings, said penetrant liquid being normally capable of wetting and spreading into the surface openings of flaws in the test body, removing the penetrant liquid from the surface of the test body after said penetrant has penetrated into said surface openings and causing penetrant retained in said flaw openings to exude to the surface of said test body, the step of applying a dry developer powder which is absorptive of the penetrant liquid and which carries on the surfaces of its particles an absorbed liquid dye solvator in which the penetrant liquid is solvatable, said absorbed liquid being in an amount insufficient to prevent the powder from being applied to the test body by dusting and relatively less volatile than at least a portion of the penetrant liquid.

2. The method as defined in claim 1 in which the penetrant liquid carries a dye and the liquid carried by the developer powder is a solvator for the dye.

3. The method as defined in claim 2 in which the dye is a fluorescent dye.

4. The method of claim 3 in which the dye solvator liquid carries a second fluorescent dye solvated therein, said first dye in the penetrant liquid and said second dye in the developer powder being, with respect to each other, cascading dyes emitting different wave bands of light but one of the two dyes fluoresces in response to light emitted by the other.

5. The method as defined in claim 4 in which the dye dissolved in the penetrant liquid emits light of a wave length which causes the dye dissolved in the solvator liquid carried by the developer to fluoresce.

6. The method as defined in claim 1 in which the penetrant liquid is substantially free of dyes and at least one dye is solvated in the dye solvator carried by the developer powder.

7. The method as defined in claim 6 in which the dye carried by the solvator liquid includes a plurality of cascading dyes.

8. An activated developer powder for penetrant methods of flaw detection consisting essentially of a finely divided free-flowing powder, a dye-solvating oily liquid absorbed on the particles thereof, and a plurality of cascading fluorescent dyes solvated in said liquid.

References Cited
UNITED STATES PATENTS

| | | | |
|---|---|---|---|
| 1,707,684 | 4/1929 | Picker | 424—69X |
| 1,936,845 | 11/1933 | Lautmann | 424—69X |
| 2,491,051 | 12/1949 | McCarter | 252—449X |
| 2,960,479 | 11/1960 | Karr et al. | 252—449X |
| 2,347,644 | 5/1944 | Sell | 252—301.3 |
| 2,707,236 | 4/1955 | De Forest | 252—301.2 |
| 2,920,203 | 1/1960 | Switzer et al. | 252—301.2 |
| 3,108,187 | 10/1963 | Thornbury | 252—301.2 |
| 3,238,149 | 3/1966 | Spurr | 252—501 |

OTHER REFERENCES

Bennett: "Cosmetic Formulary," p. 234, Chemical Publishing Company (1937).

De Navarre: "The Chemistry and Manufacture of Cosmetics," 2nd ed., p. 239, D. Van Nostrand Co. Inc. (1962).

TOBIAS E. LEVOW, Primary Examiner

J. COOPER, Assistant Examiner

U.S. Cl. X.R.

252—301.3, 408